(12) United States Patent
    Seo

(10) Patent No.: US 10,916,783 B2
(45) Date of Patent: Feb. 9, 2021

(54) SEPARATOR FOR FUEL CELL, METHOD OF FABRICATING THE SAME, AND FUEL CELL ELECTRODE ASSEMBLY

(71) Applicant: AMOGREENTECH CO., LTD., Gimpo-si (KR)

(72) Inventor: In Yong Seo, Seoul (KR)

(73) Assignee: AMOGREENTECH CO., LTD., Gimpo-si (KR)

(*) Notice: Subject to any disclaimer, the term of this patent is extended or adjusted under 35 U.S.C. 154(b) by 0 days.

(21) Appl. No.: 16/861,681

(22) Filed: Apr. 29, 2020

(65) Prior Publication Data
    US 2020/0259189 A1    Aug. 13, 2020

Related U.S. Application Data

(60) Division of application No. 15/909,417, filed on Mar. 1, 2018, which is a continuation-in-part of application No. PCT/KR2016/010512, filed on Sep. 21, 2016.

(51) Int. Cl.
    *H01M 8/0239*    (2016.01)
    *H01M 8/1062*    (2016.01)
    (Continued)

(52) U.S. Cl.
    CPC ....... *H01M 8/0239* (2013.01); *H01M 8/0245* (2013.01); *H01M 8/106* (2013.01);
    (Continued)

(58) Field of Classification Search
    CPC ............. H01M 8/0239; H01M 8/0245; H01M 2008/1095; H01M 8/106; H01M 8/1062; H01M 8/109; Y02P 70/56; Y02E 60/50
    See application file for complete search history.

(56) References Cited

U.S. PATENT DOCUMENTS 7,052,793 B2     5/2006  Formato et al.
2014/0349213 A1* 11/2014 Pintauro ............. H01M 8/1044
                                                    429/492
(Continued)

FOREIGN PATENT DOCUMENTS

KR    20070019868    2/2007
KR    20110073109    6/2011
(Continued)

OTHER PUBLICATIONS

International Search Report—PCT/KR2016/010512 dated Dec. 26, 2016.

*Primary Examiner* — Michael L Dignan
(74) *Attorney, Agent, or Firm* — Cantor Colburn LLP

(57) ABSTRACT

Provided is a method of manufacturing a separator for a fuel cell comprising: accumulating fibers obtained by electrospinning a spinning solution in which a polymer and a solvent are mixed to obtain a first support having first pores in a three-dimensional network structure; electrospraying a spraying solution in which a first ion exchange resin and a solvent are mixed to spray droplets of the first ion exchange resin on the first support body; accumulating fibers obtained by electrospinning a spinning solution in which a polymer and a solvent are mixed on the first support to form a second support having second pores in a three-dimensional network structure; and electrospraying a spraying solution in which a second ion exchange resin and a solvent are mixed to spray droplets of the second ion exchange resin on the second support body and fill the second ion exchange resin in the second pores.

6 Claims, 5 Drawing Sheets

(51) Int. Cl.
*H01M 8/1086* (2016.01)
*H01M 8/106* (2016.01)
*H01M 8/0245* (2016.01)
*H01M 8/1018* (2016.01)

(52) U.S. Cl.
CPC ......... *H01M 8/109* (2013.01); *H01M 8/1062* (2013.01); *H01M 2008/1095* (2013.01); *Y02P 70/50* (2015.11)

(56) References Cited

U.S. PATENT DOCUMENTS

| | | | | |
|---|---|---|---|---|
| 2015/0064602 | A1* | 3/2015 | Lee | H01M 8/1081 |
| | | | | 429/483 |
| 2015/0303505 | A1* | 10/2015 | Lee | H01M 4/8875 |
| | | | | 429/482 |
| 2016/0149250 | A1* | 5/2016 | Onoue | H01M 8/1004 |
| | | | | 429/482 |
| 2018/0053943 | A1 | 2/2018 | Suzuki et al. | |

FOREIGN PATENT DOCUMENTS

| | | |
|---|---|---|
| KR | 20110093714 | 8/2011 |
| KR | 20130001294 | 1/2013 |
| KR | 20140085885 | 7/2014 |
| KR | 20140112669 | 9/2014 |

* cited by examiner

SEPARATOR FOR FUEL CELL, METHOD OF FABRICATING THE SAME, AND FUEL CELL ELECTRODE ASSEMBLY

TECHNICAL FIELD

The present invention relates to a separator for a fuel cell, and more particularly, to a separator for a fuel cell, a manufacturing method thereof, and a fuel cell electrode assembly capable of realizing an ultra-thin structure, reducing a manufacturing process, and preventing damage to a support due to charging and discharging energy.

BACKGROUND ART

Recently, an energy problem has become a big concern as the industry is highly developed.

Accordingly, there is a growing demand for new energy sources that are environmentally friendly and have high power.

The fuel cell is an energy conversion device that converts the chemical energy of fuel into electric energy. The fuel cell has high energy density and high efficiency, and is expected to be used as an environmentally friendly energy source.

The fuel cell generates electric energy from the chemical reaction energy of hydrogen contained in a hydrocarbon-based material such as methanol, ethanol, and natural gas and oxygen supplied from the outside. Depending on the kind of the electrolyte, the fuel cell is classified into a Phosphoric Acid Fuel Cell (PAFC), a Molten Carbonate Fuel Cell (MCFC), a Solid Oxide Fuel Cell (SOFC), a Polymer Electrolyte Membrane Fuel Cell (PEMFC), and the like.

Among the fuel cells, the Polymer Electrolyte Fuel Cell (PEMFC) has excellent output characteristics, can solve a corrosion problem by using a solid polymer membrane, has the quick start and response characteristics, and can obtain the high energy conversion efficiency and high current density at low temperature. Accordingly, the Polymer Electrolyte Fuel Cell (PEMFC) is applied in various fields such as an automobile power supply, distributed power supply, and small power supply.

Korean Patent Application Publication No. 10-2013-0001294 proposed a technique for preventing wrinkles from being formed in a solid polymer electrolyte membrane of a fuel cell by thermally transferring an electrode catalyst layer to either surface of the solid polymer electrolyte membrane using a protective film. Accordingly, it is possible to prevent the electrode catalyst layer from being peeled off by the wrinkles of the solid polymer electrolyte membrane. However, since the thermal expansion coefficient of the solid polymer electrolyte membrane is different from that of the electrode catalyst layer, the electrode catalyst layer may be peeled off from the solid polymer electrolyte membrane and the mechanical strength of the solid poly electrolyte membrane may be lowered during charging and discharging, due to the heat generated when the fuel cell is driven. As a result, the fuel cell may be deformed or damaged to lower the reliability of the fuel cell. Therefore, it is required to develop a separator for a fuel cell having a new structure capable of improving reliability.

DISCLOSURE

Technical Problem

The present invention has been conceived in view of the above points, and an object of the present invention is to provide a separator for a fuel cell, a manufacturing method thereof, and a fuel cell electrode assembly, in which a support is formed by accumulating fibers obtained by electrospinning, and droplets of an ion exchange resin are sprayed on the support to thereby fill a plurality of pores of the support with the ion exchange resin, to thus realize an ultra-thin structure and reduce a manufacturing process.

Another object of the present invention is to provide a separator for a fuel cell, which is capable of preventing damage to a support due to charging and discharging energy and thus improving reliability, a method of manufacturing the separator, and a fuel cell electrode assembly.

Still another object of the present invention is to provide a separator for a fuel cell and a method of manufacturing the same, in which a multi-layer structure is formed by repeating an electrospinning process of forming a support of a pore structure and an electrospraying process of spraying droplets of an ion exchange resin into the support and filling the pores with the ion exchange resin in turn to increase a filling rate of the ion exchange resin.

Technical Solution

According to an aspect of the present invention, there is provided a fuel cell separator comprising: a first support having a plurality of first pores; a first ion exchange resin filled in the plurality of first pores of the first support; a second support stacked on the first support and having a plurality of second pores; and a second ion exchange resin filled in the plurality of second pores of the second support.

The first support and the second support may be composed of nanofiber membranes having pores of a three-dimensional network structure and formed by accumulating electrospun polymer fibers, respectively.

In the fuel cell separator according to an embodiment of the present invention, the sizes of the first and second pores may be in a range of 0.2 µm to 1.5 µm, and the thicknesses of the first and second supports may each be in a range of 1 µm to 3 µm.

In the fuel cell separator according to an embodiment of the present invention, the polymer fibers may be elastic polymer fibers.

In addition, the polymer fibers may contain 20 wt % to 50 wt % of a fiber-forming polymer and 50 wt % to 80 wt % of a heat-resistant polymer.

According to another aspect of the present invention, an electrode assembly for a fuel cell includes a cathode, an anode, and a separator for the fuel cell interposed between the cathode and the anode.

According to still another aspect of the present invention, a method of manufacturing a separator for a fuel cell comprises the steps of: accumulating fibers obtained by electrospinning a spinning solution in which a polymer and a solvent are mixed to obtain a first support having a plurality of first pores in a three-dimensional network structure; electrospraying a spraying solution in which a first ion exchange resin and a solvent are mixed to thereby spray droplets of the first ion exchange resin on the first support body and fill the droplets of the first ion exchange resin in the plurality of first pores of the first support; accumulating fibers obtained by electrospinning a spinning solution in which a polymer and a solvent are mixed on the first support to thus form a second support having a plurality of second pores in a three-dimensional network structure; and electrospraying a spraying solution in which a second ion exchange resin and a solvent are mixed to thereby spray droplets of the second ion exchange resin on the second support body and fill the droplets of the second ion exchange resin in the plurality of second pores of the second support.

In the method of manufacturing a separator for a fuel cell according to an embodiment of the present invention, after filling the plurality of second pores of the second support with the droplets of the second ion exchange resin, heat treating or thermal calendering of the first and second supports may be further performed.

In the method of manufacturing a separator for a fuel cell according to an embodiment of the present invention, a spraying amount of the spraying solution for forming droplets of the ion exchange resin may be twice to three times the spinning amount of the spinning solution for forming the first and second supports.

Advantageous Effects

As described above, in some embodiments of the present invention, an electrospinning process and an electrospraying process are sequentially performed so that the droplets of the ion exchange resin obtained by electrospraying are applied to the support formed between the fibers obtained by electrospinning, and the droplets of the applied ion exchange resin are spontaneously filled into the pores of the support, to thus achieve the separator for a fuel cell having an ultra-thin structure while reducing the manufacturing process.

In some embodiments of the present invention, an electrospinning process for forming a support of a pore structure and an electrospraying process for spraying droplets of an ion exchange resin into the pores to thus fill the former into the latter, are alternately repeated to form a multi-layer structure, thereby maximizing a filling rate of the ion exchange resin.

When the filling rate of the ion exchange resin is improved in the separator as described above, the ion exchange capacity is improved, and the performance of moving proton (P) generated in an anode by a supply of a fuel gas toward a cathode is improved. As a result, the performance of the fuel cell may be improved as the proton transferred through the separator and the oxygen of an oxidant gas supplied from the outside react with each other quickly and effectively at the cathode.

In some embodiments of the present invention, since a plurality of pores of a support having a three-dimensional network structure are filled with an ion exchange resin, it is possible to realize a fuel cell having excellent reliability by preventing desorption of the ion exchange resin even in charging and discharging.

In some embodiments of the present invention, a support containing an ion exchange resin in pores is formed by accumulating fibers containing an elastic polymer. Accordingly, the support excellent in elasticity may be obtained, and the support may be shrunk and expanded upon charging and discharging of the fuel cell, to thereby prevent damage to the support.

BEST MODE

Hereinafter, embodiments of the present invention will be described in detail with reference to the accompanying drawings.

Figure 1:
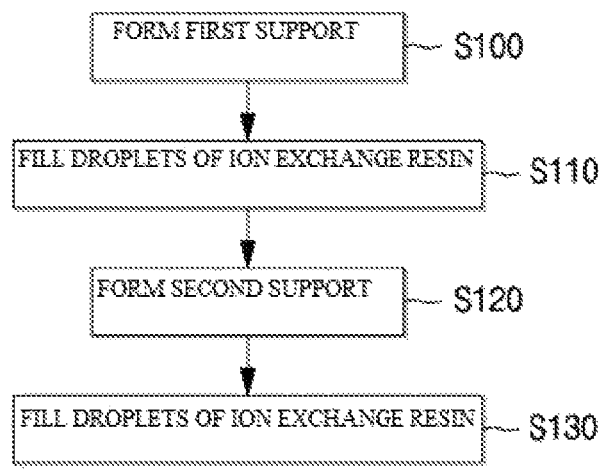
FIG. 1 is a flowchart of a method of manufacturing a separator for a fuel cell according to a first embodiment of the present invention.

Referring to FIG. 1, a method of manufacturing a separator for a fuel cell according to a first embodiment of the present invention includes: forming a first support having a plurality of first pores in a three-dimensional structure by accumulating fibers obtained by electrospinning a spinning solution mixed with a polymer and a solvent (S100).

The spinning method that may be applied for the present invention may employ any one of electrospinning, air-electrospinning (AES), electrospraying, electrobrown spinning, centrifugal electrospinning, and flash-electrospinning.

That is, the electrospinning can be performed by any electrospinning method including bottom-up electrospinning, top-down electrospinning, air spinning, or the like.

The polymer for the spinning solution may be any one of low polymer polyurethane, high polymer polyurethane, polystyrene (PS), polyvinyl alcohol (PVA), polymethyl methacrylate (PMMA), polylactic acid (PLA), polyethylene oxide (PEO), polyvinyl acetate (PVAc), polyacrylic acid (PAA), polycaprolactone (PCL), polyacrylonitrile (PAN), polyvinylpyrrolidone (PVP), polyvinylchloride (PVC), nylon, polycarbonate (PC), polyetherimide (PEI), polyvinylidene fluoride (PVdF), polyesthersulphone (PES), or a mixture thereof.

The solvent may employ one or more selected from the group consisting of dimethyl acetamide (DMA), N, N-dimethylformamide (DMF), N-methyl-2-pyrrolidinone (NMP), dimethyl sulfoxide (DMSO), tetrahydrofuran (THF), dimethylacetamide (DMAc), ethylene carbonate (EC), diethyl carbonate (DEC), dimethyl carbonate (DMC), ethyl methyl carbonate (EMC), propylene carbonate (PC), water, acetic acid, and acetone.

Then, droplets of a first ion exchange resin obtained by electrospinning a spinning solution containing a mixture of the first ion exchange resin and a solvent are applied to the first support, and the droplets of the first ion exchange resin are filled into a plurality of first pores of the first support (S110). In this case, for example, a fluorine-based resin may be used as the ion exchange resin.

Next, fibers obtained by electrospinning the spinning solution mixed with the polymer and the solvent onto the first support are accumulated to form a second support having a plurality of second pores of a three-dimensional network structure (S120).

Subsequently, droplets of a second ion exchange resin obtained by electrospinning a spraying solution containing a mixture of the second ion exchange resin and a solvent are applied to the second support, and the droplets of the second ion exchange resin are filled in the plurality of second pores of the second support (S130).

When the steps S100 to S130 are performed, a fuel cell separator is manufactured in which the fuel cell separator includes: a first support formed by accumulating polymer fibers and having a plurality of first pores; a first ion exchange resin filled in the plurality of first pores of the first support by droplets of the first ion exchange resin obtained by being electrosprayed on the first support; a second support formed by accumulating polymer fibers on the first support and having a plurality of second pores; and a second ion exchange resin filled in the plurality of second pores of the second support by droplets of the second ion exchange resin obtained by being electrosprayed on the second support.

In some embodiments of the present invention, the above-described processes may be repeatedly performed to produce a fuel cell separator that is formed by laminating a plurality of first and second supports in which the first and second ion exchange resins are filled in the pores of the first and second supports, respectively. As a result, an electrospinning process for forming a support of a pore structure and an electrospraying process for spraying droplets of an ion exchange resin into the pores to thus fill the former into the latter, are alternately repeated to form a multi-layer structure, thereby maximizing a filling rate of the ion exchange resin.

Referring to FIGS. 2A to 2D, a method of manufacturing a separator for a fuel cell according to the first embodiment of the present invention will be described in more detail.

A separator for a fuel cell is formed by alternately performing electrospinning and electrospraying to fill pores of supports with droplets of an ion exchange resin.

The supporters 110 and 130 are formed by accumulating fibers obtained by electrospinning a spinning solution and are electrospun to a collector 20 from first and second spinning nozzles 51 and 53 to which the spinning solution is supplied and are realized in a web structure having a plurality of pores formed by accumulating the fibers on the collector 20.

Here, a grounded collector 20 in the form of a conveyor that moves at a constant speed is deployed at a lower portion spaced apart from the first and second spinning nozzles 51 and 53. When a high voltage electrostatic force is applied between the collector 20 and each of the spinning nozzles 51 and 53, the spinning solution is discharged to the fibers 110 from the first and second spinning nozzles 51 and 53 to then be spun onto the collector 20.

Then, when the spraying solution in which the ion exchange resin and the solvent are mixed is electrosprayed to the supports 110 and 130 by first and second spray nozzles 52 and 54, droplets of the ion exchange resin are discharged from the first and second spray nozzles 52 and 54, and the droplets of the ion exchange resin are applied onto the supports 110 and 130. The droplets of the ion exchange resin applied onto the supports 110 and 130 permeate and are filled into the plurality of pores of the supports by a spraying energy or spontaneously.

Figure 2A:
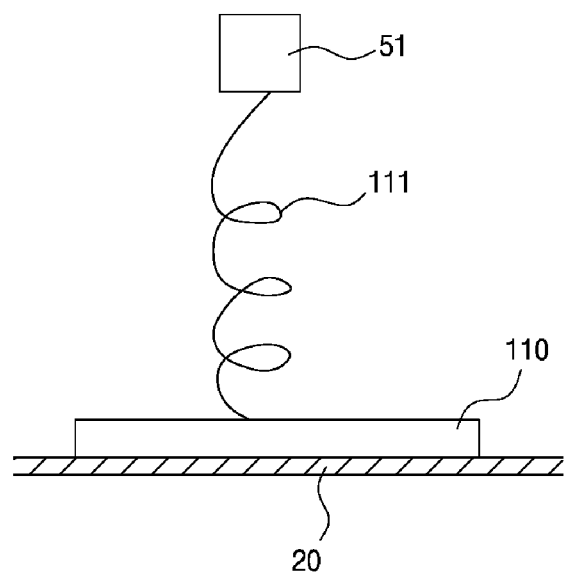
FIGS. 2A to 2D are views for explaining a method of manufacturing a separator for a fuel cell according to the first embodiment of the present invention.
Figure 2B:
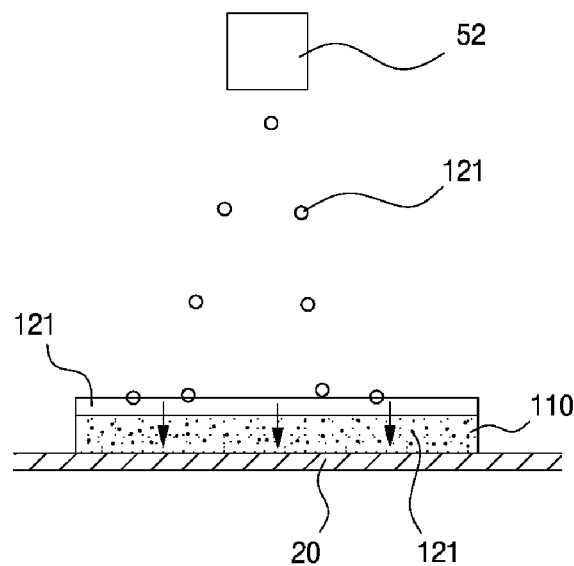

That is, the first fiber 111 discharged from the first spinning nozzle 51 is accumulated onto the collector 20 to form the first support 110 (see FIG. 2A). Then, after the first support 110 is moved to the lower portion of the first spray nozzle 52, the droplets 121 of the first ion exchange resin sprayed from the first spray nozzle 52 are applied to the first support 110 (see FIG. 2B).

Here, the droplets 121 of the first ion exchange resin rapidly penetrates into the plurality of pores of the first support 110 due to the spraying energy, and spontaneously permeate and are filled into the plurality of pores of the first support 110, due to the flowability of the first ion exchange resin.

Figure 2C:
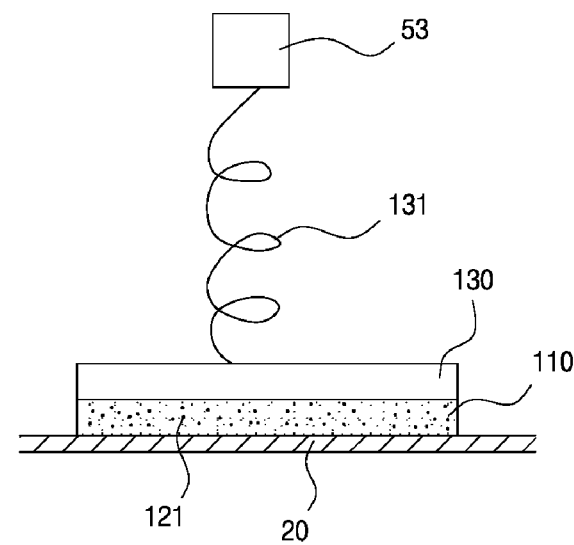
Figure 2D:
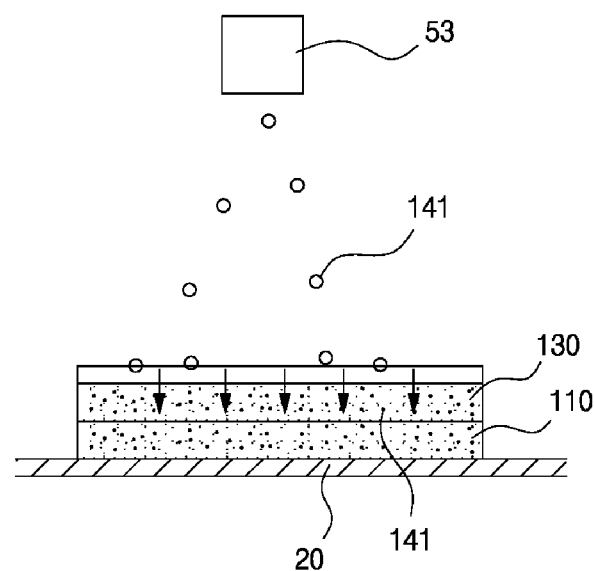
Figure 3:
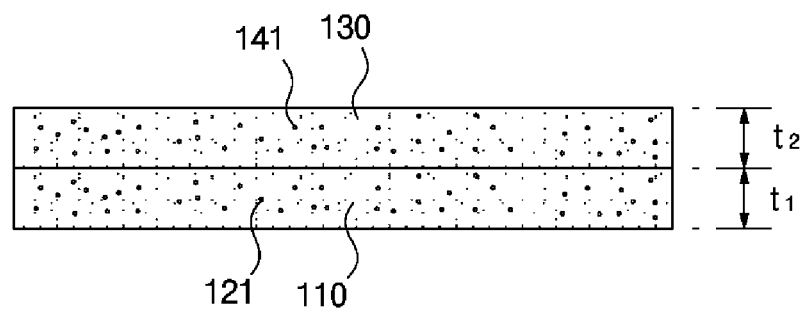
FIG. 3 is a conceptual cross-sectional view of a separator for a fuel cell according to the first embodiment of the present invention.

Then, the first support 110 filled with the droplets 121 of the first ion exchange resin is moved to the lower portion of the second spinning nozzle 53 and the spinning is carried out by the second spinning nozzle 53, and thus second fibers 131 are accumulated onto the first support 110 to form the second support 130 (see FIG. 2C). The second support 130 is moved to the lower portion of the second spray nozzle 54 and the spraying is carried out by the second spray nozzle 54, and thus the droplets 141 of the second ion exchange resin sprayed from the second spray nozzle 54 are applied to the second support 130 (see FIG. 2D).

Accordingly, the pores of the first and second supports 110 and 130 are filled with the droplets 121 and 141 of the first and second ion-exchange resins, thereby realizing the fuel cell separator.

The thicknesses t1 and t2 of the first and second supports 110 and 130 are preferably 1 μm to 3 μm. Since the thicknesses t1 and t2 of the first and second supports 110 and 130 are of an ultra-thin structure, the droplets 121 and 141 of the electrosprayed ion exchange resins may penetrate into the plurality of pores of the first and second supports 110 and 130 to thus be filled in the pores.

The thickness t1 of the first support 110 may be the same as or different from the thickness t2 of the second support 130.

The fiber diameters of the first and second supports 110 and 130 are preferably in a range of 200 nm to 1.5 μm, and more preferably in a range of 500 nm to 1 μm. The sizes of the first and second pores of the first and second supports 110 and 130 are preferably in a range of 0.2 μm to 1.5 μm.

Meanwhile, in some embodiments of the present invention, in order to fill the droplets 121 and 141 of the ion exchange resins in the plurality of pores of each of the first and second supports 110 and 130 without any gap, a spraying amount of the spraying solution for forming the droplets 121 and 141 of the ion exchange resins is set to be two to three times larger than a spinning amount of the spinning solution for forming the first and second supports 110 and 130.

The droplets 121 and 141 of the ion exchange resins sprayed from the first and second spray nozzles 52 and 54 are evaporated to vaporize the solvent from the moment the solvent is sprayed, and when the vaporized solvent reaches the first and second supports 110 and 130, a larger amount of the solvent is vaporized in the droplets 121 and 141 of the ion exchange resins.

Figure 4:
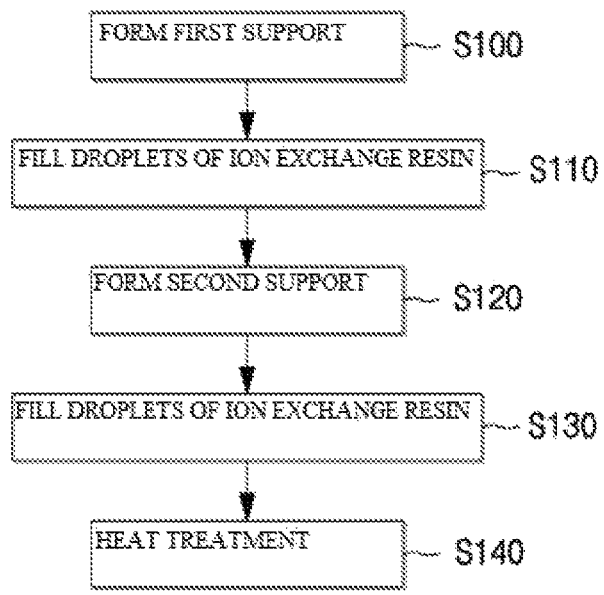
FIG. 4 is a flowchart of a method of manufacturing a separator for a fuel cell according to a second embodiment of the present invention.
Figure 5:
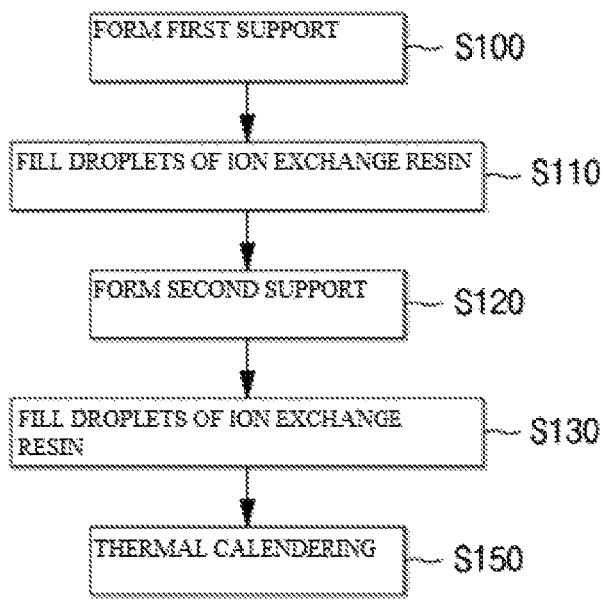
FIG. 5 is a flowchart of a method of manufacturing a separator for a fuel cell according to a third embodiment of the present invention.

FIGS. 4 and 5 are flowcharts of a method of manufacturing a separator for a fuel cell according to second and third embodiments of the present invention, respectively.

The methods of manufacturing a separator for a fuel cell according to the second and third embodiments of the present invention comprise forming a first support (S100), filling droplets of an ion exchange resin into a plurality of first pores of a first support (S110), forming a second support (S120), and filling the plurality of second pores of the second support with droplets of the ion exchange resin (S130), as in the first embodiment, and then heat treating the first and second supports (S140) in the case of the second embodiment as shown in FIG. 4, or thermal calendering process (S150) in the case of the third embodiment as shown in FIG. 5.

Here, the heat applied to the first and second supports in the heat treatment step (S140) or the thermal calendering step (S150) causes the viscosity of the ion exchange resin filled in the pores to be high, to thus remove the flowability of the ion exchange resin to thereby fix the ion exchange resin inside the plurality of pores of the first and second supports.

In the thermal calendering step (S150), the first and second supports are fed into calender rolls to which heat is applied, but the heat applied in the calender rolls has a temperature range that does not melt the first and second supports and increases the viscosity of the ion exchange resin, and the calender rolls have roll intervals that do not block the pores by pressing the first and second supports.

The fibers constituting the supports may be set to contain 20 wt % to 50 wt % of the fiber-forming polymer and 50 wt % to 80 wt % of the heat-resistant polymer. In this case, even if the heat treatment is performed at a high temperature of 200° C. to 230° C., the deformation of the supports does not occur at the heat treatment at the high temperature.

That is, even if the heat treatment process is performed at a high temperature, by setting the polymer of the spinning solution to contain 50 wt % to 80 wt % of the heat-resistant polymer and thus raising the heat resistant temperatures of the first and second supports prepared by electrospinning the spinning solution, it is possible to prevent the deformation of the second supports and increase the viscosity of the ion exchange resins filled in the pores of the first and second supports by the high-temperature heat treatment process to thus remove the flowability of the ion exchange resins and fix the ion exchange resins in the pores, thereby improving a filling rate of the ion exchange resins into the pores of the first and second supports.

Here, when the polymer of the spinning solution contains less than 50 wt % of the heat-resistant polymer, the content of the heat-resistant polymer in the first and second supports is so small that heat treatment at 200° C. or higher is not nearly possible. When the polymer of the spinning solution contains more than 80 wt % of the heat-resistant polymer, it is difficult to spin the spinning solution and is not easy to form fibers during spinning.

Therefore, as in some embodiments of the present invention, when the spinning solution containing 20 wt % to 50 wt % of the fiber-forming polymer and 50 wt % to 80 wt % of the heat-resistant polymer is electrospun, the spinning property may be improved, the excellent fiber forming may be achieved, and the heat resistance characteristic that the fiber can endure even when the heat treatment is performed at 200° C. or higher may be increased.

The fiber-forming polymer may be any polymer capable of obtaining fibers by electrospinning. Examples of the polymer include polyvinylidene fluoride (PVdF), polymethyl methacrylate (PMMA), and the like.

In some embodiments of the present invention, the fiber-forming polymer may be replaced with an elastic polymer. In this case, since the support is formed by accumulating fibers containing the elastic polymer and the heat-resistant polymer, the support that is not only deformed even at high-temperature heat treatment, but is also elastic may be implemented. Here, the elastic polymer is a polymer having properties that may be mixed with the heat-resistant polymer.

The heat-resistant polymer resin may be any one selected from the group consisting of aromatic polyesters including polyamide, poly acrylonitrile (PAN), polyimide, polyamideimide, poly (meta-phenylene isophthalamide), polysulfone, polyether ketone, polyethylene terephthalate, polytrimethylene terephthalate, and polyethylene naphthalate; polyphosphazenes including polytetrafluoroethylene, polydiphenoxaphosphazenes, and poly{bis [2-(2-methoxyethoxy) phosphazene]}; polyurethane copolymers including polyurethane and polyether urethane; cellulose acetate; cellulose acetate butyrate; cellulose acetate propionate; polyester sulfone (PES); and polyether imide (PEI), and a combination thereof.

In some embodiments of the present invention, it is possible to prepare a spinning solution by mixing an elastic polymer and a solvent, and then electrospin the spinning solution to obtain fibers, to then accumulate the fibers to form first and second supports having a plurality of pores. Polyurethane is a polymer that is a heat-resistant polymer resin and has excellent elasticity.

The first and second supports formed by accumulating the fibers made of the elastic polymer in this way are excellent in elasticity and may shrink and expand when the fuel cell is charged and discharged. Therefore, there is an advantage that damage such as tearing of the supports due to charging and discharging energy may be prevented.

Figure 6:
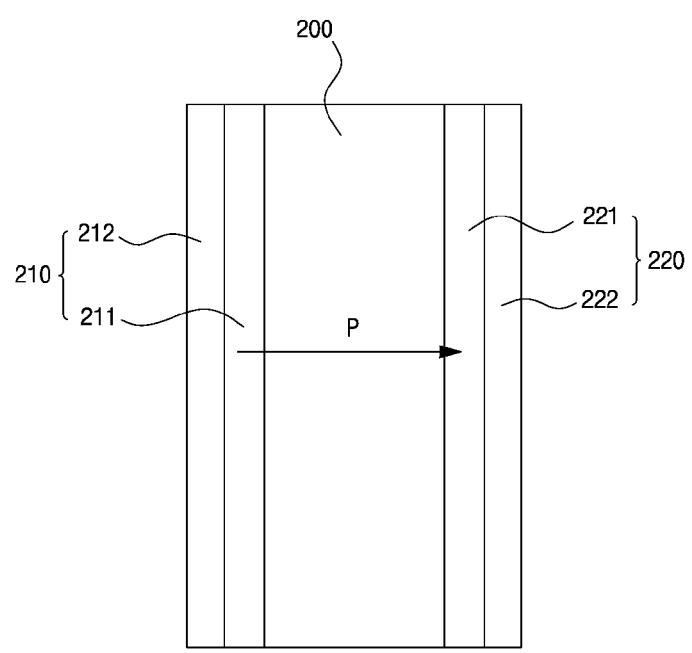
FIG. 6 is a cross-sectional view of an electrode assembly for a fuel cell according to an embodiment of the present invention.

Referring to FIG. 6, an electrode assembly for a fuel cell using a separator according to an embodiment of the present invention includes: an anode 210 to which a fuel gas containing hydrogen is supplied; a cathode 220 to which oxidant gas containing oxygen is supplied; and a fuel cell separator 200 deployed between the anode 210 and the cathode 220. Here, fibers containing a fiber-forming polymer and a heat-resistant polymer are accumulated to form a support having a plurality of pores, and an ion exchange resin serves as an electrolyte for moving proton P toward the cathode 220, in which the proton P is generated by the reaction of the fuel gas supplied to the anode 210. The ion exchange resin is filled into the pores of the support.

The anode 210 includes a catalyst layer 211 and a gas diffusion layer 212. The catalyst layer 211 containing a catalyst is in contact with and fixed to one side of the fuel cell separator 200, and the gas diffusion layer 212 is in contact with and fixed to the catalyst layer 211. A fuel gas is supplied to the gas diffusion layer 212 of the anode 210 and this fuel gas undergoes an electrochemical reaction with the catalyst of the catalyst layer 211 to generate proton P. The generated proton P moves in the cathode direction through the fuel cell separator 200.

The cathode 220 includes a catalyst layer 221 containing a catalyst and a gas diffusion layer 222, which are sequentially fixed to the other side of the fuel cell separator 200. An oxidant gas is supplied to the gas diffusion layer 222 and the catalyst of the catalyst layer 221 makes oxygen of the oxidant gas react with proton moved through the fuel cell separator 200 to produce water and electrons.

Therefore, an electric potential difference is generated between the anode and the cathode due to a chemical reaction between hydrogen and oxygen, so that current flows from the cathode to the anode, thereby obtaining electric energy and generating power.

In this case, an electrospinning process for forming a support of a pore structure and an electrospraying process for spraying droplets of an ion exchange resin into the pores to thus fill the former into the latter, are alternately repeated to form a multi-layer structure, thereby maximizing a filling rate of the ion exchange resin.

When the filling rate of the ion exchange resin is improved in the separator as described above, the ion exchange capacity is improved, and the performance of moving proton (P) generated in the anode 210 by a supply of a fuel gas toward the cathode 220 is improved. As a result, the performance of the fuel cell may be improved as the proton transferred through the separator 200 and the oxygen of an oxidant gas supplied from the outside react with each other quickly and effectively at the cathode 220.

The catalyst may react with the fuel gas and may apply any material capable of making proton and oxygen react with each other and may be made of one or more selected from the group consisting of platinum (Pt), ruthenium (Ru), a platinum ruthenium alloy (PtRu), palladium (Pd), rhodium (Rh), iridium (Ir), osmium (Os), and gold (Au). In addition, the catalyst is supported on a carrier and used. Carbon powder, activated carbon powder, graphite powder and the like are used as the carrier. The carrier carrying the catalyst may include a binder to maintain the adhesion between the separator and the gas diffusion layer.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention can be applied to a separator for a fuel cell capable of realizing an ultra-thin structure, reducing a manufacturing process, and preventing damage to a support by charging and discharging energy. An electrospinning process for forming a support of a pore structure and an electrospraying process for spraying droplets of an ion exchange resin into the pores to thus fill the former into the latter, are alternately repeated to form a multi-layer structure, thereby maximizing a filling rate of the ion exchange resin.

What is claimed is:

1. A method of manufacturing a separator for a fuel cell, the method comprising the steps of:
    preparing a spinning solution consisting of a solvent and a polymer soluble to the solvent, wherein the polymer consists of 20 wt % to 50 wt % of a fiber-forming polymer and 50 wt % to 80 wt % of a heat-resistant polymer;
    electrospinning the spinning solution towards a collector and accumulating first electrospun fibers on the collector to form a first support formed of the first accumulated electrospun fibers and having first pores in a three-dimensional network structure;
    electrospraying a first spraying solution towards the first support and filling droplets of the first spraying solution into the first pores of the first support, wherein the spraying solution is a mixture of a first ion exchange resin and a solvent;
    electrospinning the spinning solution towards the first support and accumulating second electrospun fibers on the first support to form a second support formed of the second accumulated electrospun fibers and having second pores in a three-dimensional network structure;
    electrospraying a second spraying solution towards the second support and filling droplets of the second spraying solution into the second pores of the second support, wherein the second spraying solution is a mixture of a second ion exchange resin and a solvent; and
    heating or thermal-calendering the first support filled with the first spray solution and the second support filled with the second spray solution at a temperature of 200° C. to 230 to fix the first ion exchange resin inside of the first pores and the second ion exchange resin inside of the second pores, respectively.

2. The method of claim 1, wherein a spraying amount of the first spraying solution is twice to three times a spinning amount of the spinning solution for forming the first support, and a spraying amount of the second spraying solution is twice to three times a spinning amount of the spinning solution for forming the second support.

3. The method of claim 1, wherein the first pores and the second pores have a pore size in a range of 0.2 µm to 1.5 µm.

4. The method of claim 1, wherein the first support and the second support have a thickness in a range of 1 µm to 3 µm.

5. The method of claim 1, wherein the fiber-forming polymer includes: polyvinylidene fluoride (PVdF) and polymethyl methacrylate (PMMA).

6. The method of claim 1, wherein the heat-resistant polymer includes: any one selected from the group consisting of aromatic polyesters including polyamide, polyacrylonitrile (PAN), polyimide, polyamideimide, poly (metaphenylene isophthalamide), polysulfone, polyether ketone, polyethylene terephthalate, polytrimethylene terephthalate, and polyethylene naphthalate; polyphosphazenes including polytetrafluoroethylene, polydiphenoxaphosphazenes, and poly {bis [2-(2-methoxyethoxy) phosphazene]}; polyurethane copolymers including polyurethane and polyether urethane; cellulose acetate; cellulose acetate butyrate; cellulose acetate propionate; polyester sulfone (PES); and polyether imide (PEI), and a combination thereof.

* * * * *